United States Patent Office 3,361,783
Patented Jan. 2, 1968

3,361,783
SILYLUREAS
Walter Fink, Zurich, Switzerland, assignor to Monsanto Company, a corporation of Delaware
No Drawing. Filed Nov. 14, 1963, Ser. No. 323,613
Claims priority, application Switzerland, Nov. 16, 1962, 13,412/62
15 Claims. (Cl. 260—448.2)

ABSTRACT OF THE DISCLOSURE

Process for preparing silylurea compounds by reacting compounds of the formula $R_{4-n}Si(NR'R'')_n$ with an organic isocyanate of the formula $R'''(NCO)_y$, silylurea compounds of the formula

and prepolymers of $R_{4-n}Si(NR'R'')_n$ with at least about 0.5 of a molar amount of $R'''(NCO)_x$ wherein $x$ is at least 2.

---

Several silylurea compounds have previously been known. Trimethylsilyl and triphenylsilyl derivatives of urea, methylurea and phenylurea have been obtained by reacting trimethylchlorosilane or triphenylchlorosilane with the corresponding silver or alkali salts of the ureas (Dissertation, K. Lindner, Technische Hochschule Karlsruhe 1961). Another well-known process depends on the re-amination of aminosilanes by ureas. In this manner from t-butylaminotrimethylsilane and the respective ureas, the trimethylsilyl derivatives of the urea, cyclic ethyleneurea and N,N'-dimethylurea have been prepared (U.S. Patent 2,906,756).

Based on the indications found in the literature it may be concluded that the direct reaction of urea or urea derivatives with chlorosilanes does not lead to silylated ureas.

Now, a simple process for preparing silylurea compounds has been found. The process comprises the reaction of isocyanates with aminosilanes. The simplest organic aminosilanes which can be used within the scope of this invention have the formula

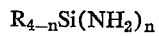

In this formula R is an aliphatic, cycloaliphatic, araliphatic, aromatic or heterocyclic radical. Normally the R groups will not contain more than 24 carbon atoms for this reactant and usually it is preferred that an R group contain not more than 14 carbon atoms. In many cases it is preferred to limit R to 8 carbon atoms. It can contain ethylenic or acetylenic unsaturations and/or optional substituents, such as halogen, OH, SH, CN, $NO_2$, NHR, $NR_2$, CO, SO, $SO_2$ etc. Moreover, the chain of carbon atoms of the radical can be interrupted by heteroatoms, such as O, S, N, Si, etc., or by heteroatom groups, such as SO, NH, NR, etc.

The starting compounds are obtained by reacting substituted chlorosilanes with ammonia or silanes with ammonia and alkali metal. When 2 to 3 radicals R are present, they can be identical or different. Two radicals taken together can also form a cyclic structure. Simple representatives which are known from the technical literature are amino-triethylsilane, amino - α - chloroethyldiethylsilane, amino-β-chloroethyl-diethylsilane, aminotripropylsilane, aminotriphenylsilane, amino-α-trinaphthylsilane, aminodiethylsilylmethylenetriethylsilane, etc.

Another class of starting compounds is represented by the silylated primary amines, which correspond to the formula

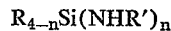

The substituent NHR′, attached with the nitrogen atom to the silicon atom, is a radical of a primary amine. The number of well known silyl derivatives of primary amines today is very large. A tabular summary of such silicon-nitrogen compounds may be found in (R. Fessenden and J. S. Fessenden, Chemical Reviews 61, 361, 1961).

The reaction of silylated ammonia or silylated primary amines with reactive organic isocyanates occurs according to the scheme

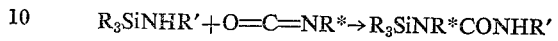

depending on the number of amini groups present, 1 to 4 urea groups can be formed on the silicon atom. The silylurea compounds previously known contain only one urea group.

It is generally known that NH or $NH_2$ groups can react with isocyanates. The reaction, as a rule, proceeds the faster the more basic these groups are. It is also known that tertiary amines do not react with isocyanates, since no active hydrogen atoms are present. Surprisingly, it has now been found, that the reaction of aminosilanes with isocyanates is not restricted to the presence of a mobile hydrogen atom on the nitrogen atom. Therefore, silyl derivatives of secondary amines can also be brought to reaction. The addition of the isocyanate in such cases occurs according to the scheme

which has hitherto not been known. R′ and R″ can be radicals such as R and are illustrated further hereinbelow.

It is apparent that the isocyanate molecule is simply inserted between the silicon atom and nitrogen atom. Thus, silylureas are formed, whose nitrogen atoms are completely substituted and do not posses any hydrogen atom. However, the amino group originally on the silicon has changed its position. This reaction can also be carried out with diaminosilanes, triaminosilanes and tetraaminosilanes.

Another class of starting compounds, namely silyl derivatives of secondary amines, are also suitable for the process of invention. These compounds possess the formula

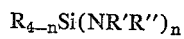

wherein the substituent NR′R″, attached with the nitrogen atom to the silicon atom, is the radical of secondary amine and $n$ has the value of 1 to 4. A large number of such compounds is also known and they can be prepared according to the directions found in the technical literature. Among the secondary amines usable are also included heterocyclic amines, such as ethyleneimine, pyrrole, pyrrolidine, pyrazole, imidazole, triazole, tetraazole, indole, carbazole, piperidine, morpholine and so forth. This means that the radicals R′ and R″ taken together with the nitrogen atom can form a cyclic structure. It is clear that silyl derivatives of diamines, such as ethylenediamine, bis-(methylamino)-ethane, tetramethylenediamine, hexamethylenediamine, phenylenediamine, piperazine, etc., or polyamines, such as pentamethylenetriamine, guanidine, melamine, etc., can also be used. These polyfunctional amines can be singly or multiply silylated. Two amino groups can also be linked through a silicon atom forming a heterocycle. However, compounds having two or three silyl groups attached to the same nitrogen atom, i.e., disilazanes, trisilazanes, cyclosilazanes, etc., are not included in starting products within the scope of this invention.

Included in the term "aminosilane" used for the starting compounds, is any compound which has at least one primary, secondary or tertiary amino group attached to the silicon atom. This includes the silylaminoacids, which are reacted in the form of their esters, amides or lactams. Known examples for such starting products are

Me$_3$SiNHCH$_2$COOC$_2$H$_5$
Me$_3$SiNHCH$_2$COOSiMe$_3$ m-, o-, p-Me$_3$SiNHC$_6$H$_4$COOSiMe$_3$, etc. Corresponding sulfonic acid derivatives are also suitable. As with the simple amine compounds, in these cases each hydrogen atom of the amino group can be replaced.

On reacting aminosilanes with isocyanates it has been found that a number of isocyanate molecules can be reacted with one aminosilane molecule. It is possible to introduce two or more molecules of an organic isocyanate into a mono-aminosilane, forming silylbiurets or silylpolyureas. A correspondingly greater amount of isocyanate can be introduced in di-, tri- and tetraaminosilanes. The novel compounds, if a simple monoaminosilane is used as a precursor, have the formula

R$_3$Si(NR*CO)$_m$NR'R"

wherein $m$ signifies an integer. The compounds of this type are included in the term "silylurea compounds."

From the possibility of inserting several molecules of isocyanate between a silicon atom and a nitrogen atom, it is apparent that silylated carboxylic amides and imides are also usable in the novel reaction. These represent another class of starting compounds and are called "amidosilanes." The preferred amido are the radicals of carbamides, such as urea, biuret, carbamic esters, allophanic esters etc. and other carboxylic amides or imides, such as acetamide, benzamide, oxamide, succinic imide, phthalic imide can also be used. The reaction of amidosilanes with isocyanates is also possible, when the amido group has a tertiary character, i.e. does not possess an active hydrogen. Illustrative examples from the literature are, for example, N-trimethylsilylurea, N-trimethylsilylcarbamic ethylester, N-trimethylsilylacetamide, N,N'-bis(trimethylsilyl)-oxamide, N-trimethylsilylsuccinic imide etc. The known silylated cyclic ureas, such as 2-imidazolidinone and hexahydropyrimidinone, are also useful starting products.

Experiments have shown that the silylurea compounds formulated above are very sensitive towards hydrolysis, if $m=1$. Cold water causes a rather fast decomposition into the corresponding silanol and urea derivative. Such compounds can only be preserved by excluding moisture and for many application purposes such as, for example, the treatment of products of cotton, wool, leather, paper, etc. can be used with only adequate precautions.

If however, $m=2$ or greater, i.e. at least 2 molecules of isocyanate have been introduced per Si-N bond, the resulting silylurea compounds are unexpectedly much more stable against hydrolysis. It is assumed that the amino group standing at the end forms a 1:1 adduct with the silicon atom with the help of its $sp^3d$ orbital. This is illustrated as follows:

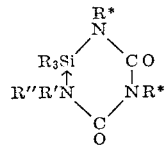

The reaction of diaminosilanes or diamidosilanes with mono-functional isocyanates in a molar ratio of 1:4, or more, gives in a similar manner stabilized silylurea compounds.

The organic isocyanates serving as second reactants possess the general formula

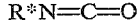
R*N=C=O

R* is a radical usually occurring in organic isocyanates. R* normally will not contain more than 24 carbon atoms and usually not more than 14 carbon atoms. In many cases it is preferred to limit R* to 8 carbon atoms. Therefore, R* is a hydrocarbon radical which can contain unsaturation and which can have substituents, such as O, S, CN, NO$_2$, SO, SO$_2$, NR$_2$ etc. which are inert to isocyanate, and also sulfonyl groups or acyl groups can be present. Examples of isocyanates which can be reacted with aminosilanes or amidosilanes as described herein are: methylisocyanate, ethylisocyanate, isobutylisocyanate, phenylisocyanate, alpha-naphthylisocyanate, beta-naphthylisocyanate, vinylisocyanate, carbethoxyisocyanate, acetylisocyanate, heptadecenylisocyanate, alpha-isocyanatocarboxylic acid esters, methanesulfonylisocyanate, benzenesulfonylisocyanate etc. Depending on the circumstances, compounds capable of releasing isocyanate, i.e. "masked" isocyanate, are also suitable.

Interesting and useful prepolymer compositions of this invention are made by reacting an aminosilazane as defined hereinabove with a polyisocyanate of the formula R'''(NCO)$_x$. The same conditions can be used as for reacting the monoisocyanates and the reaction proceeds in the same manner; however, in the case of the polyisocyanates normally it is preferred to keep the temperature at about 30° C. or less. If a large excess of polyisocyanate is used as suggested in Example 11, prepolymer is formed having free isocyanate groups which facilitates the use of the prepolymer in making polyurethane foams.

A great number of multivalent isocyanates are known which can be used in the present reaction. They correspond to the general formula

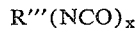
R'''(NCO)$_x$ wherein $x$ is an integer of at least 2 and R''' is an organic radical having $x$ isocyanate groups. R''' normally will not contain more than 24 carbon atoms. R''' can be the same type of radical as R* except that it is a di- or poly- rather than a mono-radical due to the presence of more than one NCO group. All types of di- and polyfunctional isocyanates of the aliphatic, hydroaromatic and aromatic range can be added to amino- and amidosilanes to give the polymers of invention. Examples are 1,2-diisocyanatoethane, 1,3-diisocyanatopropane, 1,4-diisocyanatobutane, diisocyanatoethylethane, diisocyanatophenylethane, 1,6-diisocyanatohexane, 1,8 - diisocyanatooctane, 1,4 - diisocyanatocyclohexane, 1,3-diisocyanatocyclohexane, 4,4'-diisocyanatodicyclohexylmethane, 1,4 - diisocyanatobenzene, 1-chloro-2,4-diisocyanatobenzene, 2,4- and 2,6-diisocyanatotoluene and the commercial mixture 65:35 thereof, 4,4'-diisocyanatodiphenylmethane, 3,3'-dimethyl-4,4'-diisocyanatodiphenyl, 4,4'-diisocyanatodiphenyl, 3,3'-dimethoxy-4,4'-diisocyanatodiphenyl, 1,5- and 1,8-diisocyanatonaphthalene. Also, trimerisation products of diisocyanates which contain two or more free isocyanate groups can be used. They can be prepared by, for example, the catalytic influence of phosphines upon corresponding isocyanates. Especially suitable mixtures of diisocyanates are those known commercially as "Crude MDI" which contain about 60% of 4,4'-diphenylmethanediisocyanate along with other isomeric and analogous polyisocyanates such as 4,4',4"-triisocyanatotriphenylmethane and

Mixtures such as "Crude MDI" can be made by methods described in U.S. 2,683,730.

Also useful are diisocyanates with hydrocarbon radicals which are linked through heteroatoms or heteroatom groups like S, (CH$_2$)$_3$S(CH$_2$)$_3$, O, SO$_2$NH, S$_2$, SO$_2$, SO$_2$NHCH$_2$CH$_2$NHSO$_2$, CO, CO$_2$NH, N=N, OCH$_2$CH$_2$O etc.

Triisocyanates and polyisocyanates can similarly be used. Examples are 4,4',4"-triisocyanatotriphenylmethane, 1-methyl-4,6,4'-triisocyanatodiphenylmethane, the reaction product of 1 mole of trimethylolpropane and 3 moles of diisocyanatotoluene, polymeric isocyanatophenylmethylene, polymers obtained by reaction of oxygen and hexamethylene diisocyanates etc. The multivalent isocyanates which can be used here may also contain unsaturated radicals, such as 4,4'-diisocyanatostilbene. Other unsaturated diisocyanates can be prepared by, for example, by reaction of 2 moles of diisocyanatotoluene and 1 mole of an unsaturated diol, such as 1,4-butenediol, 1,4-butinediol etc.

In carrying out the reaction, the reactants are mixed in convenient proportions, and usually an exothermic reaction starts at ambient temperature. When the precursor compounds contain substituents, such as OH, SH, $NH_2$ etc., having active hydrogen, the quantity of the isocyanate has to be increased to react with these groups. It is expedient to heat the reaction mixture at higher temperatures, e.g. 60–120° C. after the initial reaction slows down. The duration of this additional heating is determined in general by the number of the molecules of isocyanate to be introduced. It can amount to 5 minutes or several hours. One can work with or without a solvent. Suitable solvents are those which react neither with the starting compounds containing a Si-N bond, nor with the isocyanates, such as hexene, benzene, toluene, xylene, methylchloride, ether etc. The working-up and the purification of the endproducts, depending on the nature of the endproducts, is possible, by distillation under reduced pressure, crystallization or sublimation and other methods. The products resulting from the process are liquid or solid, depending on the organo groups which are present. In general, the silylurea compounds having one urea group per silicon atom can be distilled without decomposition. If hexane is used as a solvent, two layers are formed in the reaction. The heavier layer consisting of the desired silylurea compound can be separated and used without further purification. They can be used as heat transfer liquids at high temperatures, lubricant additives for thermally highly stressed machine parts, hydraulic fluids, textile agents, anti-foamants, anti-oxidants, stabilizers, accelerators in vulcanization, plasticizers, hydrophobing agents, flame-proofing agents, active ingredients of pesticides and means for combatting undesired plant growth. The novel compounds having unsaturated and/or other reactive substituents are valuable intermediates for the preparation of polymers. The products containing 2 or more molecules of isocyanate are capable of releasing the isocyanate at higher temperatures. These temperatures are quite generally above the boiling point of the isocyanate. However, if compounds which are reactive towards the isocyanate are present, reaction of the isocyanate can occur at much lower temperature. For this reason, the silylurea compounds of invention can also serve as stibilized isocyanates.

*Example 1*

To 14.5 g. of pure $(CH_3)_3SiN(C_2H_5)_2$ (0.1 mole) are added 7.1 g. of pure ethylisocyanate (0.1 mole) excluding moisture. An exothermic reaction ensues. The mixture is heated at 110° C. for ½ hour and distilled under reduced pressure.

Yield 20.3 g. (94%) of N-trimethylsilyl-N-ethyl-N', N'-diethylurea; B.P. 65.5° C./1 mm. $n_D^{20}$ 1.4478.

*Analysis.*—$C_{10}H_{24}N_2OSi$. Calc.: percent C, 55.50; H, 11.18; N, 12.94. Found: percent C, 55.50; H, 11.25; N, 12.71. Molecular weight: Calc., 216.4. Found (in benzene), 218.

*Example 2*

To 14.5 g. of pure $(CH_3)_3SiN(C_2H_5)_2$ (0.1 mole) are added 9.9 g. of n-butylisocyanate (0.1 mole) excluding moisture. An exothermic reaction ensues. The mixture is heated at 40° C. for 1 hour and distilled under reduced pressure.

Yield 21.8 g. (89%) of N-trimethylsilyl-N-n-butyl-N', N'-diethyl-urea; B.P. 84° C./1.1 mm., $n_D^{20}$ 1.4510.

*Analysis.*—$C_{12}H_{28}N_2OSi$. Calc.: Percent C, 58.96; H, 11.54; N, 11.46. Found: Percent C, 59.02; H, 11.52; N, 11.10. Molecular weight: Calc., 244.4. Found (in benzene), 238.

*Example 3*

To 14.5 g. of pure $(CH_3)_3SiN(C_2H_5)_2$ (0.1 mole) are added 11.9 g. of phenylisocyanate (0.1 mole) excluding moisture. An exothermic reaction ensues. The mixture is cooled with ice, subsequently heated up to 40° C. and distilled under reduced pressure.

Yield 23.1 g. (87%) of N-trimethylsilyl-N-phenyl-N', N'-diethyl-urea; B.P. 95° C./0.04 mm., M.P. 24–26° C., $n_D^{28}$ 1.5058.

*Analysis.*—$C_{14}H_{24}N_2OSi$. Calc.: Percent C, 63.58; H, 9.15; N, 10.59. Found: Percent C, 63.27; H, 9.10; N, 10.51. Molecular weight: Calc., 264.4. Found (in benzene), 248.

*Example 4*

To 14.5 g. of pure $(CH_3)_3SiN(C_2H_5)_2$ (0.1 mole) are added 15.0 g. of ethylisocyanate (0.21 mole) excluding moisture. The mixture is heated at 130° C. for 3 hours and the excess of isocyanate is removed at 25° C./1 mm.

Yield 28.6 g. (100%) of 1-trimethylsilyl-1.3.5-tetraethyl-biuret; $n_D^{20}$ 1.4630.

*Analysis.*—$C_{13}H_{29}N_3O_2Si$. Calc.: Percent C, 54.31; H, 10.17; N, 14.62. Found: Percent C, 53.21; H, 10.80; N, 14.01.

*Example 5*

To 14.5 g. of pure $(CH_3)_3SiN(C_2H_5)_2$ (0.1 mole) are added 21.0 g. of n-butylisocyanate (0.21 mole) excluding moisture. The mixture is heated at 170° C. for 3 hours and the excess of isocyanate is removed at 50° C./1 mm.

Yield 32.1 g. (93%) of 1-trimethylsilyl-1.3-di-n-butyl-5.5-diethylbiuret; $n_D^{20}$ 1.4635.

*Analysis.*—$C_{17}H_{37}N_3O_2Si$. Calc.: Percent C, 59.43; H, 10.85; N, 12.23. Found: Percent C, 59.11; H, 10.61; N, 11.31.

*Example 6*

To 14.5 g. of pure $(CH_3)_3SiN(C_2H_5)_2$ (0.1 mole) are added 24.0 g. of phenylisocyanate (0.2 mole) excluding moisture. The mixture is cooled with ice and subsequently heated at 40° C. The product is recrystallized in hexane.

Yield 31.3 g. (81%) of 1-trimethylsilyl-1,3-diphenyl-5.5-diethylbiuret; M.P. 108–109° C.

*Analysis.*—$C_{21}H_{29}N_3O_2Si$. Calc.: Percent C, 65.76; H, 7.62; N, 10.96. Found: Percent C, 65.58; H, 7.82; N, 11.01. Molecular weight: Calc., 383.5. Found (in benzene), 388.

*Example 7*

To a solution of 10.1 g. of $(CH_3)_2Si[N(C_2H_5)_2]_2$ (0.05 mole) in 15–30 ml. of n-hexane are added 11.9 g. of phenylisocyanate (0.1 mole) excluding moisture. An exothermic reaction ensues. Two layers become apparent. Upon distillation of the hexane under reduced pressure, a viscous liquid having the structure

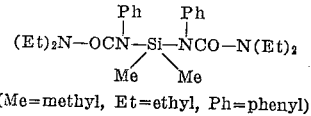

(Me=methyl, Et=ethyl, Ph=phenyl)

remains. The hydrolysis with 1 to 2 drops of water yields N-phenyl-N'-diethylurea.

The same product is obtained without using a solvent. In this case the reaction mixture is expediently cooled.

*Example 8*

To a solution of 5.06 g. of bis-(diethylamino)-dimethylsilane (0.025 mole) in 15 ml. of n-hexane are added 11.9 g. of phenylisocyanate (0.1 mole) excluding moisture. An exothermic reaction ensues and upon boiling for 5–10 minutes no free isocyanate groups can be detected in the infrared spectrum. Two layers become apparent.

Upon distillation of the hexane a viscous liquid having the structure $$(Et)_2N-(OCN)_2-\underset{\underset{Ph}{|}\;\underset{Me}{|}\;\underset{Ph}{|}}{Si}-(NCO)_2-N(Et)_2$$

remains.

The product is relatively stable towards water.

Example 9

To the product, obtained according to the Example 8, in 15 ml. of hexane are added 5.9 g. of phenylisocyanate (0.5 mole). An exothermic reaction ensues. Upon stirring for 1 hour two layers become apparent. The heavier layer is a viscous liquid having the structure $$(Et)_2N-(OCN)_3-\underset{\underset{Ph}{|}\;\underset{Me}{|}\;\underset{Ph}{|}}{Si}-(NCO)_3-N(Et)_2$$

The product releases phenylisocyanate on heating at temperatures above the boiling point of the phenylisocyanate.

A textile product of cotton is dipped into a 5% solution of the silylurea compound in hexane. Upon drying and heating at 150° for 15 minutes, the textile product displays an agreeable touch and increased resistance against humidity, staining and creasing.

Example 10

To 10.1 g. of bis-(diethylamino)-dimethylsilane (0.05 mole) are added 59.4 g. of n-butylisocyanate (0.6 mole) and the mixture is refluxed (about 113° C., B.P. of n-butylisocyanate). As the isocyanate is consumed, the temperature is raised up to 200° C. within 3 hours. The highly viscous liquid probably has the structure $$(Et)_2N-(OCN)_6-\underset{\underset{Bu}{|}\;\underset{Me}{|}\;\underset{Bu}{|}}{Si}-(NCO)_6-N(Et)_2$$

(Bu=n-butyl)

The product releases n-butylisocyanate on heating at temperatures above the boiling point of the n-butylisocyanate.

A 5% solution of the silylurea compound is sprayed on the paper in the course of its manufacture at the time when it reaches the end of a series of drying drums of the manufacturing machine. This paper displays a reduced absorption of moisture and increased wet-resistance.

Example 11

14.5 g. (0.1 mole) of $(CH_3)_3SiN(C_2H_5)_2$ are added to a flask. Care is taken to exclude moisture from the flask by nitrogen blanketing or other suitable means. Over a period of one hour 34.8 g. (0.2 mole) of diisocyanatotoluene (65% 2,4- and 35% 2,6-diisocyanatotoluene) is added to the flask with stirring and external cooling, to prevent the temperature from rising substantially as a result of the exothermic reaction which occurs; however, the temperature rise can be tempered by a slow rate of addition of diisocyanate as well. The resultant product is a prepolymer which is useful as a component in the making of polyurethane foams providing all or at least a portion of the polyisocyanate component for the foam. The silicon portion of the prepolymer can also act as a foam stabilizer in a similar manner as silicones are known to do in conventional polyurethane foam.

Depending on the use for which the prepolymer is intended the ratio of diisocyanate to amino silane used in making the prepolymer can vary from about 0.5:1 to about 10:1 with preferred ratios being in the range of 1:1 to 5:1.

Alternatively, the polyisocyanate and the aminosilane can be added to a polyol and foaming agent to provide for an in-situ preparation of the foam from these basic raw materials.

What is claimed is:

1. A process for preparing silylurea compounds comprising mixing a compound of the formula $$R_{4-n}Si(NR'R'')_n$$

wherein R is hydrocarbon and R' and R'' are each selected from the class consisting of hydrogen and hydrocarbon, and n is an integer from 1 to 4, with an organic isocyanate of the formula R''' $(NCO)_y$ wherein R''' is hydrocarbon and y is an integer.

2. A process of claim 1 wherein y is 1.
3. A process of claim 1 wherein y is at least 2.
4. A process of claim 1 wherein an inert solvent is used.
5. A process of claim 1 wherein n is 1, y is 1 R, R', R'' and R''' are hydrocarbon, each having not more than 8 carbon atoms, and the ratio of isocyanate to silane reactant is at least about 1:1 molar.
6. A process of claim 1 wherein n is 2, y is 1 R, R', R'' and R''' are hydrocarbon each having not more than 8 carbon atoms, and the ratio of isocyanate to silane is at least about 2:1 molar.
7. A process of claim 1 wherein n is 1, y is 2, R, R', R'' and R''' are hydrocarbon each having not more than 14 carbon atoms, and the ratio of isocyanate to silane is at least about 0.5:1 molar.
8. A compound of the formula $$R_{4-n}Si[(NR'''CO)_m-NR'R'']_n$$

wherein R is hydrocarbon, R' and R'' are each selected from the class consisting of hydrogen and hydrocarbon, n is an integer of from 1 to 4, and m is an integer greater than n.

9. A compound of claim 8 wherein m is from 2 to 12.
10. A compound of claim 8 wherein R, R', R'' and R''' are hydrocarbon each having not more than 8 carbon atoms, n is 1, and m is 2.
11. A compound of claim 8 wherein R, R', R'' and R''' are hydrocarbon each having not more than 8 carbon atoms, n is 2, and m is 4.
12. A compound of claim 8 wherein R, R', R'' and R''' are hydrocarbon each having not more than 8 carbon atoms, n is 2 and m is 6.
13. A compound of claim 8 wherein R, R', R'' and R''' are hydrocarbon each having not more than 8 carbon atoms, n is 2 and m is 12.
14. A prepolymer of a compound of the formula $$R_{4-n}Si(NR'R'')_n$$

wherein R is hydrocarbon, R' and R'' are each selected from the class consisting of hydrogen and hydrocarbon, and n is an integer from 1 to 4, with at least about 0.5 molar amount of a polyisocyanate of the formula $$R'''(NCO)_x$$

wherein R''' is hydrocarbon and x is an integer of at least 2.

15. A prepolymer of claim 14 wherein R, R', R'' and R''' are each hydrocarbon having not more than 14 carbon atoms, n is 1 and x is 2.

References Cited
UNITED STATES PATENTS 3,172,874 3/1965 Klebe _____ 260—448.2 X
3,208,971 9/1965 Gilkey et al. ____ 260—448.2 X TOBIAS E. LEVOW, *Primary Examiner.*

P. F. SHAVER, *Assistant Examiner.*